Patented Apr. 18, 1939

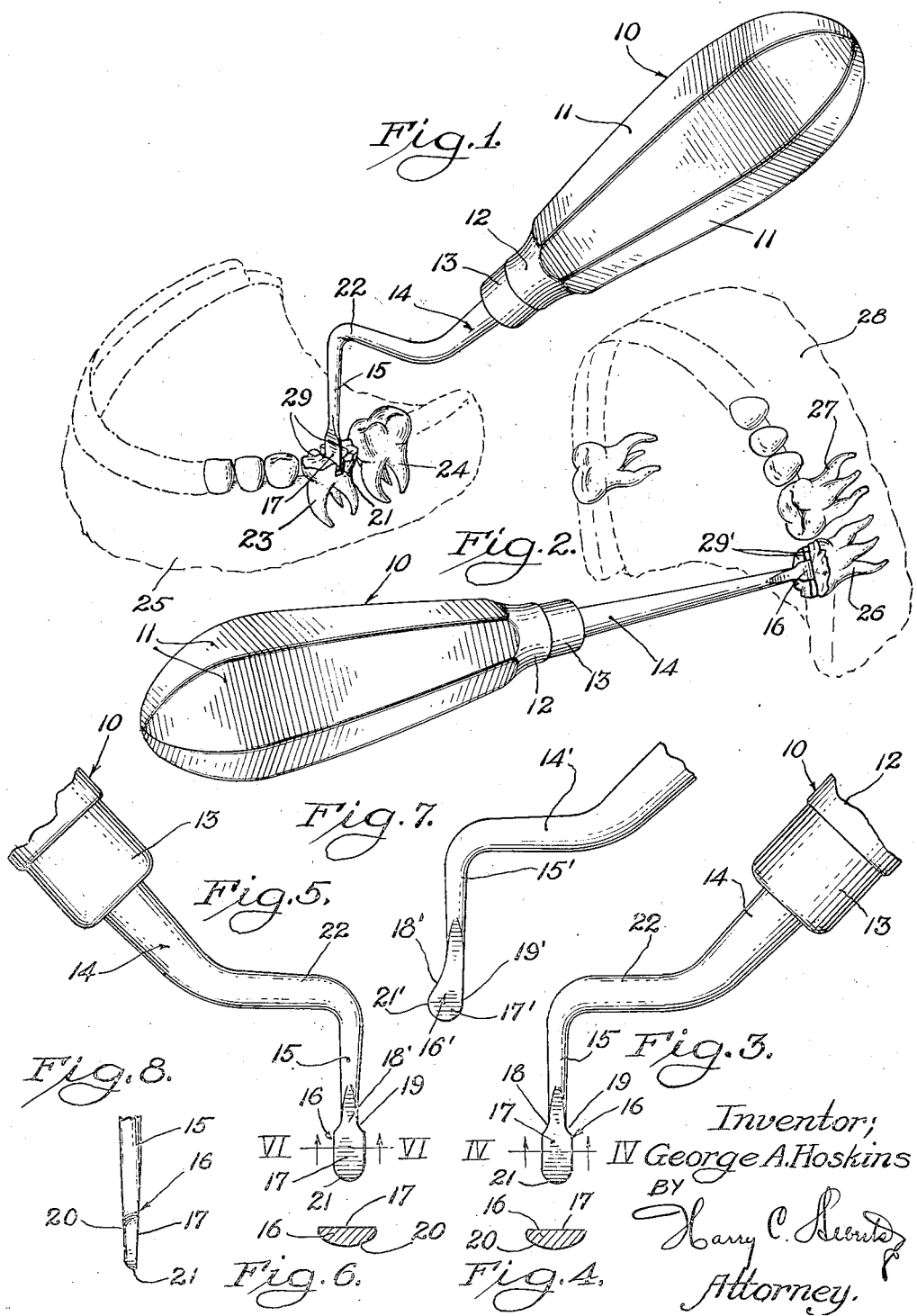

2,154,751

UNITED STATES PATENT OFFICE 2,154,751

ORAL ROOT DIVIDER

George A. Hoskins, Chicago, Ill.

Application November 18, 1935, Serial No. 50,327

3 Claims. (Cl. 32—45)

This invention relates to oral root dividers and more particularly to instruments for use in connection with the extraction of teeth from the human mouth, although it may be employed with equal advantage for other purposes.

It contemplates more especially the provision of a simple, inexpensive and especially efficacious device that can be efficiently utilized to divide the roots of teeth such as molars that are found in the human mouth and which cannot be grasped with the usual extracting instruments owing to the frequent absence of their crowns due to decay or accidental fracture.

Numerous types of instruments have heretofore been designed for both the extraction, elevation and dividing of teeth and teeth roots preparatory to their removal from the human mouth. The most serious problem is the extraction of molars in instances where their crowns are absent owing to decay or accidental fracture in that the roots of molars render their extraction difficult and do not provide for instrument attachment thereto. It has been found highly desirable, therefore, to separate the lingual and buccal roots prior to their removal, since the attendant or dentist can then utilize any elevator of standard construction to effect their removal separately without injury to or surgery on the gum or jaw.

It is difficult, if not impossible, to effectively remove the roots of molars by resort to an elevator or other instrument unless the individual roots are separated without injury to or laceration of the gum and/or jaw. It is the proper technique to first provide a groove in the exposed surfaces of the teeth from which the crown has been separated by decay or otherwise, and have such extend to a depth that is as close as possible to the root bifurcation. The groove should be in a direction so as to divide the lingual from the buccal root, and thus present access for a root divider of the type embodying features of the present invention.

One object of the present invention is to simplify the construction and improve the operation of devices of the character mentioned.

Another object is to provide an oral root divider of novel and simple construction that will improve the technique of extracting molars devoid of crowns.

A further object is to provide a root divider having an operating extremity within the clear vision of the dentist or attendant while utilizing the instrument for its intended purpose.

A still further object is to provide an oral root divider having an enlarged visible extremity comprising a combination of a flat and convex surface merging in a sharp peripheral edge to render a visible, efficacious and safe separation of molar roots.

Other objects and advantages will appear from the following description of the preferred embodiment of the present invention.

In the drawing:

Figure 1 is a perspective view showing the lower jaw of the mouth with a tooth therein for the utilization of a root divider embodying features of the present invention.

Figure 2 is a perspective view of the upper jaw of the mouth with a tooth therein for utilization of the root divider embodying features of the present invention.

Figure 3 is a front view of a right hand instrument embodying features of the present invention, the handle member portion being broken away for convenient illustration.

Figure 4 is a sectional view substantially along the line IV—IV of Figure 3.

Figure 5 is a front view of a left hand instrument embodying features of the present invention, the handle portion being broken away for convenient illustration.

Figure 6 is a sectional view taken along line VI—VI of Figure 5.

Figure 7 is a front view in elevation of a modified embodiment of the present invention, the handle member being broken away for convenient illustration.

Figure 8 is an edge or side view of the operating end of the device shown in Figures 3 and 5.

The structure selected for illustration comprises a handle member 10 of any convenient shape, size, and configuration to render the manual grasp thereof convenient and positive. The handle member 10 may be of metallic or any other suitable construction as commercial practice may dictate. In the present embodiment, the handle 10 has flat surfaces 11 in polygonal formation that permit the steady and certain grasp thereof without any possible rotary movement or displacement while being grasped.

As shown, the handle member 10 terminates in a reduced extremity 12 that provides a still further reduced neck 13 from which an elongated shank 14 emerges or projects. The elongated shank 14 may be integrally or detachably associated with the handle member 10 for axial extension from the neck 13 thereof, and the shank 14 preferably tapers down to any desired thickness so as to reduce the extreme portion 15 to the minimum size and thickness consistent with the stress and load to be sustained in performing its intended function.

Of course, the elongated shank 14 is made from high grade stainless steel or alloys providing maximum strength and utmost sanitation, it being possible to utilize ordinary steel that has been plated with chromium or other metals depending upon the requirements and dictates of commercial practice.

The extreme portion 15 of the shank 14 is reduced to its minimum size consistent with the load requirements because it is desired that such should enable complete vision by the attendant of the operating extremity 16 comprising an efficient root divider. The root dividing extremity 16 is preferably greater in width than the reduced extremity portion 15 of the shank 14 and comprises, in this instance, an enlarged flat surface 17 that is, in this instance, symmetrically merged with the reduced shank portion 15 by means of fillets 18 and 19 that disposes the divider extremity 16 in longitudinal alignment with the shank 14 or its end portion 15.

The side opposite the flat surface 17 is, in this instance, convex in configuration to present an arcuate surface 20 that provides the desired wedging action. The flat and convex confronting surfaces 17 and 20, respectively, merge in a periphery 21 that tapers down to a sharp thin edge that enables the penetrating and wedging action for root division and separation as will appear more fully hereinafter. It is apparent that the elongated shank 14 may take different shapes depending upon the desired use of the instrument on the right or left side of the lower or upper jaw. For use of the instrument on the lower jaw, the elongated shank 14 has a substantially inverted-V formation 22 which directs the operating extremity 16 normal or perpendicularly to the exposed surface of the molar teeth devoid of the usual crown portion.

The flat surface 17 is preferable in the plane of the V-shaped portion 22 so as to enable its direction transversely of the molar teeth 23 and 24 found on both sides of the lower jaw 25. Both right and left hand instruments are provided to enable their use on both sides of the lower jaw as is apparent from the showing in Figures 3 and 5. To enable the use of a divider of this type on molar teeth 26 and 27 found on both sides of the upper jaw, the shank 14 is preferably straight and without any irregular formations. This furnishes the best access to molars 26 and 27 in the upper jaw 28 as the mouth is opened by the patient to present the upper jaw in a position to receive an instrument with a straight shank.

In the modified structure (Figure 7) the operating extremity 16' has one side 18' which is enlarged to extend laterally for a substantial distance sufficient to provide the flat surface 17' with an area equivalent to that shown in the preceding embodiment. The other side 19' is straight and extends directly from the shank 15' but the lateral projected portion 18' provides increased vision and area which must be consistent with the load requirements and extend for a distance that will comprise a substantial portion of the width or length of the exposed tooth surface from which the crown has been detached. With this arrangement, the operating extremity 16' is clearly visible to the attendant or dentist and the splitting action can be directed and watched carefully to insure the proper results. The enlarged extremities 17 and 17' of both embodiments comprise the operating ends of the instruments described supra, and these are designed to impart the sufficient wedging and bearing surfaces. Otherwise, this modified structure has substantially the same shape and arrangement of confronting flat-convex surfaces so as to present a flat surface 17' and convex surface with the periphery 21' constituting a sharp thin merging edge therebetween that terminates in a rounded extremity for affording convenient penetration and gradual progressive wedging action.

In utilizing the instrument of the type described supra, the technique prescribes that a groove 29 be provided across the face or exposed surface of the molar. This is effected by utilizing a bi-bevel drill or a round bus so as to provide the groove 29 across or transverse to the lower jaw bone 25 for a depth of two to three centimeters. The instrument with its operating extremity 16 is then placed in the groove 29 and the wedging action is effected to separate the lingual from the buccal roots. This is made possible by a combination of the confronting flat and convex surfaces 17—20 so that a wedging and separating action is effected along the line of least strength in view of the weakening action effected by the groove 29. When the roots have been separated, the usual elevators or other instrument may be resorted to for the purpose of effecting their removal. It is to be noted in the upper jaw, the groove 29' is provided in a direction longitudinal to the upper jaw bone 28 so as to first separate one of the roots from the other two roots which are always found in upper molars. After the first root has been separated, then a transverse groove will be provided therein in much the same way as described in connection with the lower jaw molars, thereby separating remaining roots from each other to enable their individual removal.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. An oral root divider comprising a handle member, an elongated round comparatively small shank connected to said handle member and tapering into a neck of reduced diameter, and an enlarged wedging extremity flaring outwardly from said shank neck, said wedging extremity including a flat surface larger than said shank, a convex surface on the side opposite to said flat surface, and a sharp curved operating edge merging said convex and flat surfaces.

2. An oral root divider comprising a handle member, an elongated round comparatively small shank connected to said handle member and tapering into a neck of reduced diameter, and an enlarged wedging extremity flaring outwardly from said shank neck, said wedging extremity including a flat surface larger than said shank, a convex surface on the side opposite to said flat surface, and a sharp curved operating edge merging said convex and flat surfaces, said wedging extremity having a laterally extended curved area in the plane of said flat surface to enable vision to the operating edge during the use thereof as a root divider.

3. An oral root divider comprising a handle member, an elongated round comparatively small shank connected to said handle member and tapering into a neck of reduced diameter, and an enlarged wedging extremity flaring outwardly from said shank neck, said wedging extremity including a flat surface wider than said shank, a convex surface on the side opposite to said flat surface, and a sharp curved operating edge merging said convex and flat surfaces, said wedging extremity being curved in the plane of said flat surface and extending laterally beyond said shank to enable vision to the operating edge during the use thereof as a root divider.

GEORGE A. HOSKINS.